United States Patent [19]
Agari

[11] Patent Number: 5,358,336
[45] Date of Patent: Oct. 25, 1994

[54] LINEAR MOTION ROLLING GUIDE UNIT
[75] Inventor: Norimasa Agari, Seki, Japan
[73] Assignee: Nippon Thompson Co., Ltd., Tokyo, Japan
[21] Appl. No.: 108,401
[22] Filed: Aug. 19, 1993
[30] Foreign Application Priority Data Aug. 20, 1992 [JP] Japan .................. 4-063565[U]

[51] Int. Cl.5 ............................................. F16C 29/06
[52] U.S. Cl. ................................... 384/15; 384/45
[58] Field of Search ................. 384/15, 43, 44, 45

[56] References Cited
U.S. PATENT DOCUMENTS 5,209,575  5/1993  Ohtake ................................. 384/15

FOREIGN PATENT DOCUMENTS 118317  12/1991  Japan .
121220  12/1991  Japan .
19918   2/1992   Japan .
23818   2/1992   Japan .
25028   2/1992   Japan .

Primary Examiner—Thomas R. Hannon
Attorney, Agent, or Firm—Browdy and Neimark

[57] ABSTRACT

In the linear motion rolling guide unit, because the under seals are removably mounted to the end caps with ease, the under seals are prevented from being deformed or buckled and thus the guide unit does not require high precision machining. The under seals mounted to the end caps have lip portions that seal the gaps between the casing, the end caps and the track rail. A pair of projections provided to each end cap are inserted into an engagement opening formed in and extending longitudinally of the under seal to removably mount the under seal to the end caps with ease. The under seal is allowed to move with respect to the end caps as the under seal is deformed lengthwise and widthwide.

6 Claims, 4 Drawing Sheets

LINEAR MOTION ROLLING GUIDE UNIT

BACKGROUND OF THE INVENTION

Field of the Invention

The present invention relates to a linear motion rolling guide unit which is applied to sliding portions of machine tools, processing equipment, and testing equipment, and in which sliders slide on track rails with a number of rolling elements interposed therebetween.

Description of the Prior Art

In a conventional linear motion rolling guide unit, when a slider slides on a track rail, the seal between the slider and the track rail is provided by end seals mounted at both ends of the slider and an under seal mounted to the underside of the slider.

A conventional linear motion rolling guide unit as shown in FIG. 9 has been disclosed. As shown in the figure, the linear motion rolling guide unit consists mainly of a track rail 1 with raceway grooves 9 formed longitudinally extending on both side walls 11 thereof and a slider 20 slidably mounted astride the track rail 1. The slider 20 includes a casing 2, which is slidable relative to the track rail 1 and has raceway grooves 8 formed at positions facing the raceway grooves 9, a number of rolling elements or balls 4, which are trapped between the opposing raceway grooves 8, 9 to allow relative motion between the rail and the casing, and end caps 5 attached to the longitudinal ends of the casing 2.

The end cap 5 is fitted with an end seal 19 that provides a seal between the track rail 1 and the slider 20. The casing 2 is provided with an under seal 3 to seal the casing 2, the longitudinal side walls 11 of the track rail 1 and the underside of the casing 2.

The slider 20 is mounted astride the track rail 1 and is freely slidable on the rail 1 because of the presence of a number of balls 4 that circulate along the raceway grooves 9 in the rail 1. The balls 4 roll in a raceway 24 formed between the raceway groove 9 in the track rail 1 and the raceway groove 8 in the casing 2 and are led into a direction changing passage (indicated by 23 in FIG. 3) formed in the end cap 5 and further into a return passage 25 formed parallel to the raceway groove 8 in the casing 2, so that the balls 4 roll to circulate in an endless raceway.

The under seal 3 is simple in shape and thus can be manufactured easily. However, the under seal 3 has the drawback of being easily deformed by positioning errors of the casing 2 and the track rail 1 forming raceway grooves 8, 9 therein and by external force because it is formed of a thin plate. To describe in more detail, when the slider 20 slides on the track rail 1, any temperature variations and swelling by lubricant of the under seal 3 will deform the under seal 3 itself degrading its sealing performance.

Further, in the linear motion rolling guide unit the under seal 3 is secured at both ends to the casing 2 made of a metal by screws, so that when the under seal 3 formed of plastic such as synthetic resin soaks up lubricant and swells after a long period of service, it cannot move relative to the casing 2 and thus will deform. Once the under seal 3 deforms, the tight sealing or contact between the underside of the casing 2 and the upper surface of the under seal 3 fails, or the sealing portion deforms. In the linear motion rolling guide unit, when the sealing contact between the sealing portion and the side surfaces 11 of the track rail 1 degrades, the sealing performance, particularly the dust sealing effect, deteriorates.

Among the dust sealing apparatuses used in the linear motion rolling guide unit are those disclosed by Japanese Utility Model Laid-Open No. 118317/1991, 121220/1991, 19918/1992, 23818/1992 and 25028/1992.

The under seal device for the linear guide bearing disclosed in the Japanese Utility Model Laid-Open No. 118317/1991 has projections formed at the axial ends of the under seal that extend in the axial direction to fit into engagement openings formed in the bottom surfaces of the side seals. The under seal is easily attached to or detached from the side seals of large strength so as to increase the strength of the under seal.

The under seal device for the linear guide bearing disclosed in the Japanese Utility Model Laid-Open No. 121220/1991 has a two-pronged projection, at both axial ends of the under seal, projecting toward the bottom surface of the slider whose prongs can open in an inverted V-shape and be resiliently deformed toward each other. The bottom surface of the slider is formed at each axial end with a vertical hole, in which the two-pronged projection of the under seal fits, and with a through-hole that pierces through the sleeve portion of the slider in a direction perpendicular to the vertical hole so that one of the prongs engaged in the vertical hole elastically deforms to urge the under seal toward the side surface of the guide rail, bringing the side edge of the under seal into sliding contact with the guide rail.

Further, in the dust sealing apparatus for the linear guide apparatus disclosed in the Japanese Utility Model Laid-Open No. 19918/1992, the end of the under seal, which closes an opening in the lower part of a gap between the slider and the guide rail, is inserted between the bent surface of the side seal and the underside of the end cap to allow one-action removal and mounting of the under seal. The under seal is formed as a rectangular strip almost equal in length to the slider and the end of the under seal is fitted between the bent surface of the side seal and the underside of the end cap.

In the dust sealing device for the linear guide apparatus of the Japanese Utility Model Laid-Open No. 23818/1992, the side seal that seals openings at the front and back of a gap between the slider and the guide rail is inserted into a recessed groove formed at the end of the opening in the end cap.

The dust sealing device for the linear guide apparatus disclosed by the Japanese Utility Model Laid-Open No. 25018/1992 presses the side seal and the under seal against the sealing surface under a predetermined pressure by spring elasticity instead of the rubber elasticity to prevent early degradation of sealing function caused by the rubber abrasion, absorb greater effects of dimensional errors and enable stable, easy mounting and dismounting of the side seal and under seal.

The under seal devices for the linear guide bearings or the dust sealing devices for the linear guide apparatuses disclosed in the above publications, like the previously mentioned, conventional linear motion rolling guide unit, do not have the construction that permits deformation of the under seal in the axial direction and therefore have the similar problems. That is, the dust sealing member and the end cap are generally formed of different materials so that their thermal expansions caused by temperature variations differ from each other. When the thermal expansion of the dust sealing member becomes larger than that of the end cap, the dust sealing member deflects producing a gap between it and the rail or the underside of the sleeve, degrading the sealing effect and making it impossible to prevent dust from entering the raceway.

SUMMARY OF THE INVENTION

An objective of this invention is to solve the above-mentioned problems and to provide a linear motion rolling guide unit, which is characterized in that the under seals to seal the gaps between the track rail and the slider are removably mounted to the end caps to absorb changes in the length and width of the under seals caused by their thermal expansion variations or their swelling by soaking of lubricant and prevent possible distortion and buckling of the under seals that would otherwise result from thermal expansion variations and swelling, thereby securing good sealing performance at all times and enabling easy mounting and dismounting of the under seals.

Another objective of this invention is to provide a linear motion rolling guide unit, which comprises:

a track rail having first raceway grooves formed on longitudinally extending side walls thereof;

a casing slidable relative to the track rail and having second raceway grooves formed at positions facing the first raceway grooves;

end caps mounted to the longitudinal ends of the casing;

a large number of rolling elements rolling and circulating through raceways formed between the first raceway grooves and the second raceway grooves; and under seals having a first lip portion that can be brought into sealing contact with the underside of the casing and the end caps and a second lip portion that can be brought into sealing contact with the side wall surfaces of the track rail;

wherein the under seals consist of a metallic core member and an elastic sealing member secured to the core member and having the first and second lip portions;

wherein the end caps each have pairs of projections protruding from the underside of the end caps, the projections in each pair being spaced widthwise, and each projection is formed with a longitudinally extending engagement portion;

wherein the core member is formed with longitudinally extending engagement openings, each of which are formed with engagement claws along the longitudinal edges thereof; and wherein the projections are elastically deformed and inserted into the engagement openings until the engagement portions of the projections are engaged by the engagement claws to attach the under seals to the end caps.

In this linear motion rolling guide unit, since the projections protruding from the underside of the end caps are fitted into the engagement openings formed in the core member of the under seal, the under seal can be mounted to and dismounted from the end caps very easily. Once the positions of the engagement openings in the under seal are set, simply inserting the projections of the end caps into the engagement openings causes the under seal to be automatically positioned and mounted to the end caps, thus eliminating the need to position the under seal with respect to the end caps.

Since, with the under seal mounted to the end caps, the sealing member of the under seal can be formed into a structure that covers the surrounding of the projections, the gaps in the boundary region between the projections and the engagement openings can easily be sealed. Hence, the under seal can seal well the gaps between the track rail, the casing and the end caps, preventing dust from adhering to the sliding surfaces.

In this linear motion rolling guide unit, since the engagement openings in the core member are longer than the longitudinal lengths of the projections, the gaps at the longitudinal ends of the engagement opening between the engagement opening and the projections are filled by the sealing member.

Further, since the engagement openings in the core member are set longer than the longitudinal lengths of the projections and the pair of engagement portions of the projections are held by the engagement claws of the core member, if the under seal should expand or contract by swelling due to soaking of lubricant or by thermal expansion due to temperature variations, the under seal can move relatively by following up lengthwise and widthwise deformations thereof because of the loose connection between the projections and the under seal, preventing the buckling or distortion of the under seal.

Therefore, the first and second lip portions of the under seal remain in sealing contact with the undersides of the casing and the end caps and with the side walls of the track rail while moving, thus providing good sealing performance. That is, the sliding surface between the track rail and the slider can be sealed in good condition at all times, preventing ingress of foreign matters such as dust, dirt or water.

Because the engagement opening is formed longer than the projections in the longitudinal direction, if there are positional deviations between the engagement openings in the under seal and the projections of the end caps due to machining errors, the longitudinal deviations or errors can easily be absorbed by the elastic member, a part of the under seal, filling the gap between the engagement opening and the projections. This eliminates the requirement for high precision in machining and therefore reduces the manufacture cost.

Further, since the upper surface of the core member of the under seal is formed with a raised portion that is made of the same material as that of the sealing member and which is elastically in contact with the underside of the end caps, the counteractive force of the raised portion pushes the under seal away from the end caps, causing the engagement portions of the projections to elastically engage the engagement claws of the core member and thereby reliably and firmly positioning the under seal in the vertical direction with respect to the end caps.

Moreover, because the projections provided to the end caps can be made of a material equivalent to that of the end caps, the projections can be formed integral with the underside of the end caps, permitting simultaneous forming and reduction in the number of parts and manufacturing cost.

Alternatively, the projections may be formed as separate structures and securely fitted into the insertion holes formed in the underside of the end caps. This allows only the projections to be removed from the end caps for replacement. That is, when the projections are damaged, there is no need to replace the entire end cap, reducing the maintenance cost and facilitating the service.

Since the under seal is formed as a separate member from the casing, it is possible to cut raceway grooves in the casing easily with high precision, substantially improving the bearing performance of the linear motion rolling guide unit.

DETAILED DESCRIPTION OF EMBODIMENTS

Figure 1:
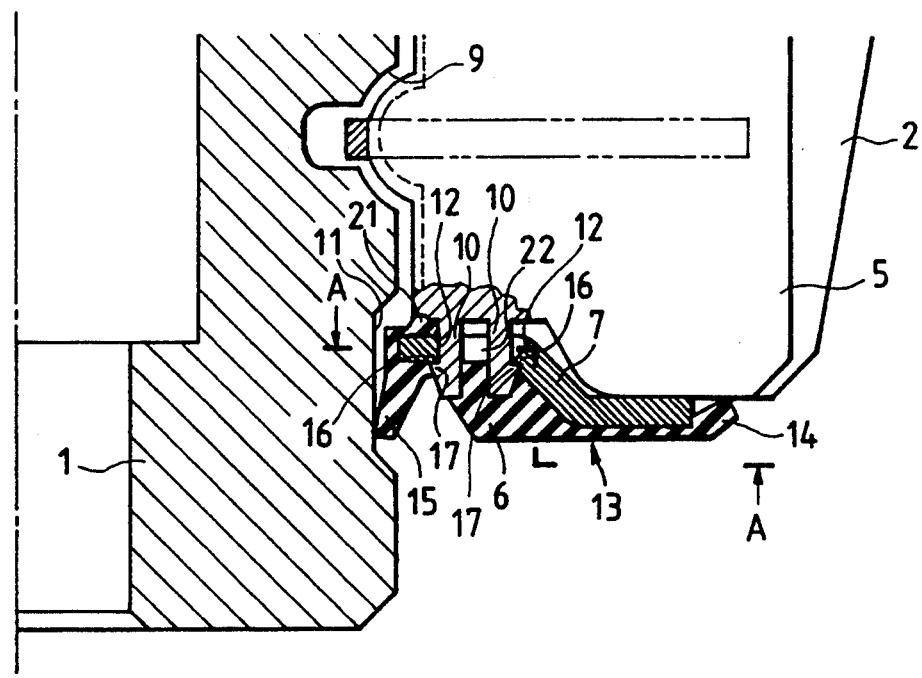
FIG. 1 is a cross section of a linear motion rolling guide unit as one embodiment of this invention.
Figure 2:
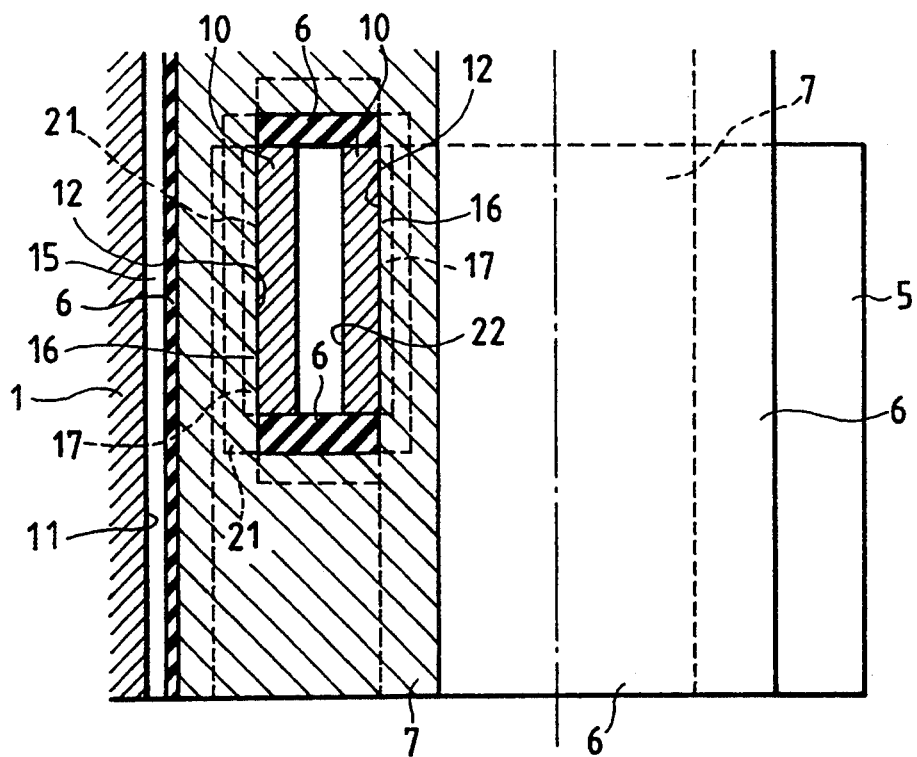
FIG. 2 is a cross section taken along the line A—A of FIG. 1.
Figure 3:
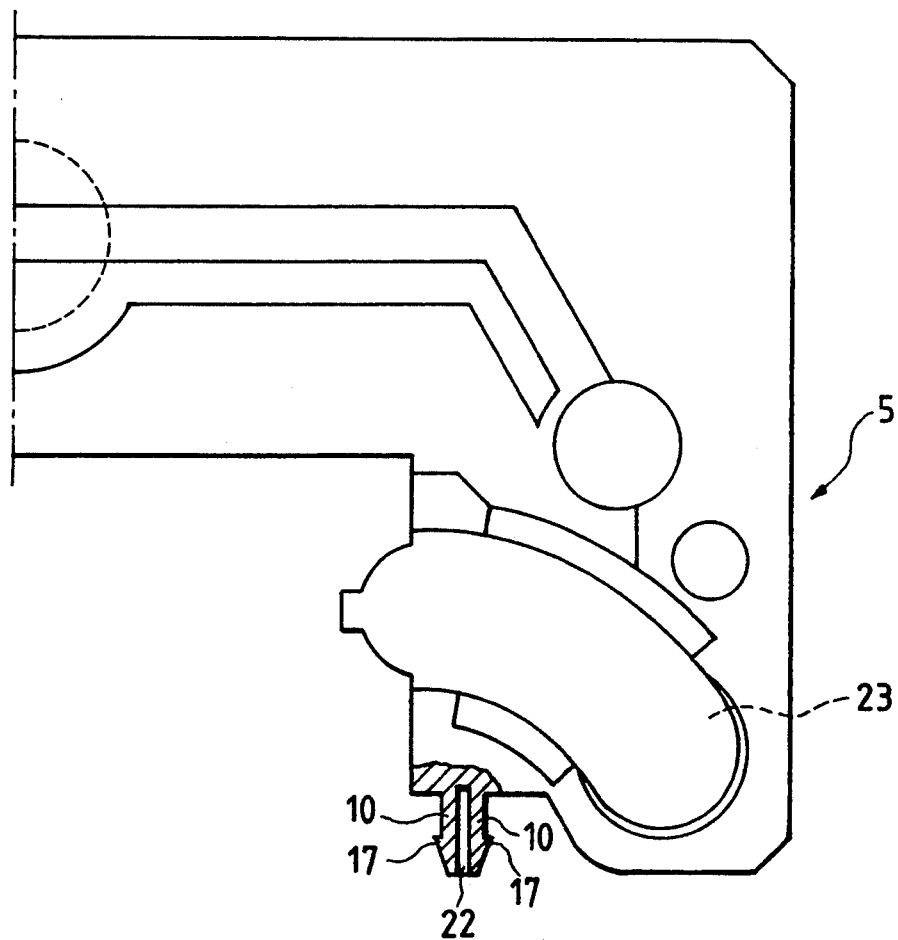
FIG. 3 is a schematic view showing a part of an end surface of the end cap.
Figure 4:
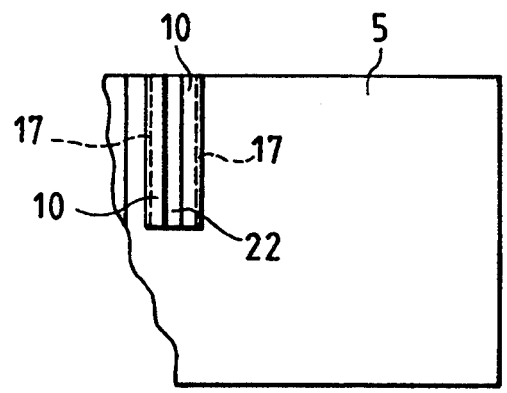
FIG. 4 is a bottom view showing a part of the underside of the end cap.

Now, by referring to the accompanying drawings, an embodiment of the linear motion rolling guide unit according to this invention will be described. In FIGS. 1 through 8 components with the same functions as those of FIG. 9 are assigned like reference numerals.

Figure 9:
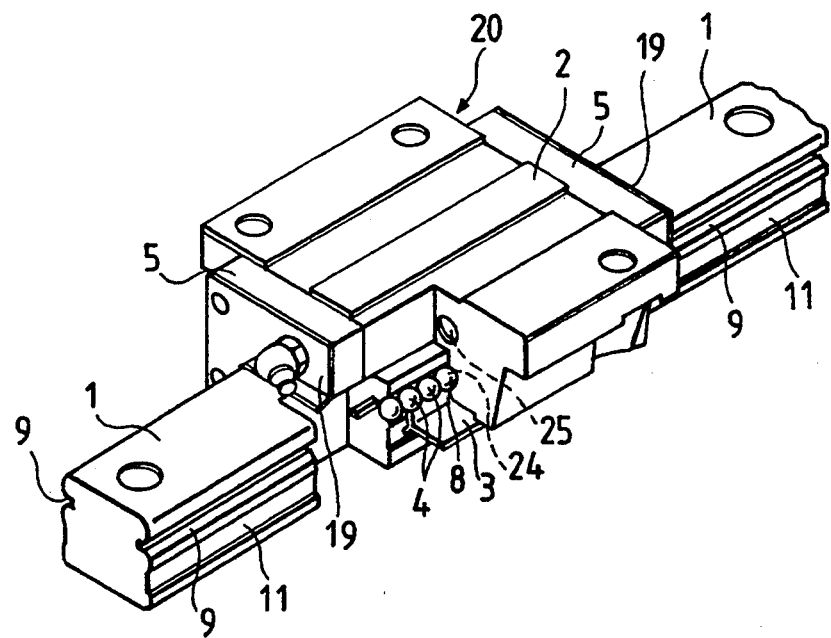
FIG. 9 is a perspective view showing an example of a conventional linear motion rolling guide unit.

The linear motion rolling guide unit of this invention has basically the same construction as the conventional linear motion rolling guide unit shown in FIG. 9 for example. The guide unit is characterized by the way in which the under seal 13 is mounted.

The linear motion rolling guide unit includes a track rail 1, which has raceway grooves 9 formed on the longitudinally extending side walls 11 like those shown in FIG. 9, and a slider 20, which is slidable relative to the track rail 1. The slider 20 includes: a casing 2, which is slidable relative to the track rail 1 and has raceway grooves 8 formed at positions facing the raceway grooves 9 as well as return passages 25; a number of rolling elements 4 that circulate rolling in each raceway 24 formed between the raceway grooves 8 and the raceway grooves 9; end caps 5 mounted at the longitudinal ends of the casing 2 and having direction changing passages 23; side seals 19 attached to the end surfaces of the end caps 5; and under seals 13 attached to the end caps 5.

The end caps 5 are secured to the end surfaces of the casing 2 by fastenings such as screws passing through mounting holes. On the inside, the end caps 5 have the direction changing passages formed at both sides for changing the direction in which the rolling elements 4 travel along the sliding surfaces between the casing 2 and the track rail 1. The end caps 5 also are formed with a recess to accommodate the track rail 1 so that it straddles the rail.

The under seal 13 consists of a core member 7 made of a metal such as steel and a sealing member 6 made of an elastic material such as rubber and plastics secured to the core member 7. The sealing member 6 has a lip portion 14, which is sealingly engageable with the underside of the casing 2 and the end caps 5, and also another lip portion 15 that can sealingly engage with the side wall surface 11 of the track rail 1.

The under seal 13 further has a raised strip 21 formed of the same material as that of the sealing member 6 on the upper surface of the core member 7. The raised strip 21 is in elastic contact with the underside of the end caps 5. The counteractive force of the raised strip 21 pushes the under seal 13 away from the end caps 5, so that engagement portions 17 of projections 10 provided on each side of the end caps 5 elastically engage with engagement claws 16 of the core member 7, thereby vertically positioning the under seal 13 reliably and securely with respect to the end caps 5.

This linear motion rolling guide unit is characterized by the following construction. That is, the core member 7 of the under seal 13 is formed with engagement openings 12 into which a pair of downwardly protruding projections 10, spaced widthwise and extending longitudinally from the underside of each end cap 5, are inserted in order to fix the under seal 13 to the underside of the end caps 5. The pair of projections 10 may be formed by cutting a slit 22 in a projection portion of the end cap 5 so that the slit extends longitudinally along the center of the bottom of the projection portion. The engagement openings 12 formed in the core member 7 are longer in the longitudinal direction than the projections 10. The gaps between the projections 10 and each engagement opening 12 at the longitudinal ends of the opening are filled by the sealing member 6 of the under seal 13. Thus, the under seal 13 can be moved longitudinally relative to the end caps 5 against the elastic force of the sealing member 6 that fills the gaps.

The pair of projections 10 can be deformed relative to the end caps 5 by elasticity. Each of the projection 10 has an engagement portion 17 protruding widthwise of the end cap. The engagement openings 12 in the core member 7 have engagement claws 16 formed along their longitudinal edges. When the engagement portions 17 of the projections 10 engage the engagement claws 16 of the core member 7, the under seal 13 is attached to the end caps 5 and held stationary.

In the linear motion rolling guide unit the projections 10 provided to the end caps 5 may be formed integral with the lower part of the end cap 5. The projections 10 need only have a hardness that permits temporary fixing by engaging the engagement portions 17 to the engagement claws 16 of the core member 7 and which allows relative motion of the under seal 13 with respect to the end cap 5 as the under seal 13 is thermally deformed lengthwise and widthwise. Thus, the projections 10 can be made of the same material as that of the end cap 5. When the projections 10 are formed integral with the lower portion of the end cap 5, they can be formed at the same time and the number of parts and therefore the manufacture cost can be reduced.

Figure 5:
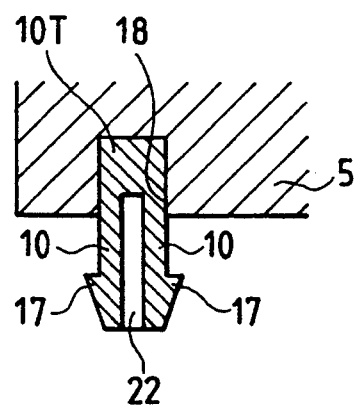
FIG. 5 is a cross section of an example of the projection provided at the underside of the end cap.
Figure 6:
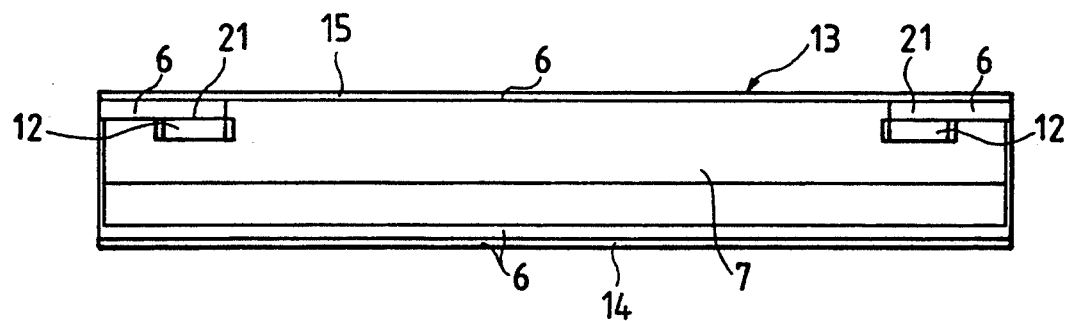
FIG. 6 is a schematic top view of the under seal.
Figure 7:
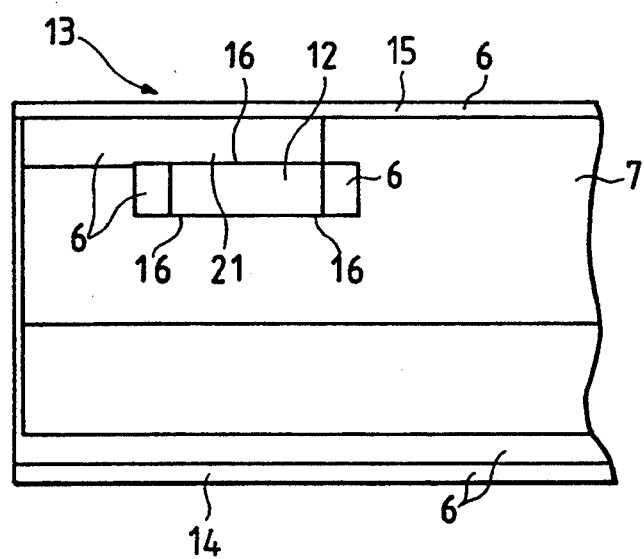
FIG. 7 is an enlarged top view showing an essential portion of FIG. 6.
Figure 8:
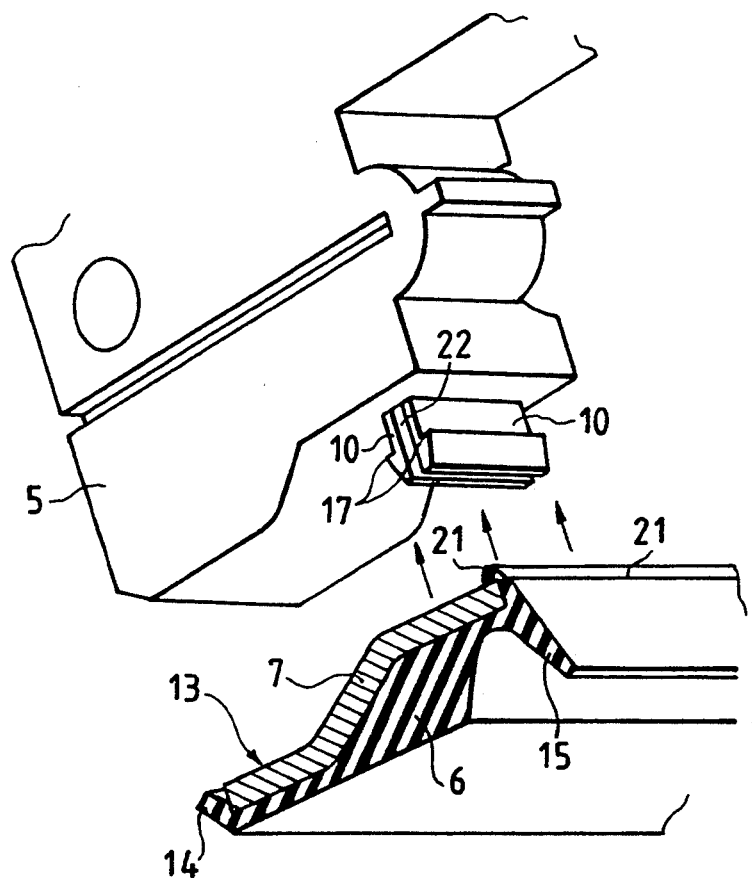
FIG. 8 is a perspective view showing the end cap and the under seal in an exploded condition.

Alternatively, as shown in FIG. 5, the projections 10 provided to the end cap 5 may be formed separate from the end cap 5. The projections 10 may be formed by cutting a slit 22 in one structural body 10T and securely fitted into an insertion hole 18 formed at the bottom of the end cap 5. When the structural body 10T is fabricated separate from the end cap 5, it is possible to use not only the same material but also different materials for the structural body 10T and the end cap 5. Particularly because the structural body 10T is removable from the end cap 5, there is no need to replace the associated end cap 5 when the projections 10 are damaged, making maintenance easy.

When the end caps 5 and the projections 10 are formed separately, the projections 10 may be securely fixed to the end caps 5 by mounting the end caps 5 to the ends of the casing 2, forming the insertion holes 18 in the end caps 5 at positions corresponding to the engagement openings 12 formed in the core member 7 of the under seal 13, and then inserting the projections 10 into the insertion holes 18. In this case, various lengths of the casing 2 can be dealt with.

Another way of fixing together the end caps and the projections involves forming the projections 10 first integrally with the end caps 5 and, when only certain projections 10 are damaged, removing the projections 10, cutting the insertion holes 18 in the end caps 5 where the projections existed, and securely inserting new projections 10 into the insertion holes 18.

Since the under seal 13 is removably fitted to the end caps 5 and not rigidly secured to the casing 2, the under seal 13 will not deform or buckle with respect to the casing 2 and end caps 5 even when there are thermal expansion variations among components caused by temperature changes. Therefore, the under seal 13 provides a good sealing performance, because its lip portion 14 is kept in sealing contact with the underside of the casing 2 and the end caps 5 and the other lip potion 15 in sealing contact with the wall surface 11 of the rail 1.

I claim:

1. In a linear motion rolling guide unit comprising:
a track rail having first raceway grooves formed on longitudinally extending side walls thereof;
a casing slidable relative to the track rail and having second raceway grooves formed at positions facing the first raceway grooves, the casing also having return passages formed therein;
end caps mounted to the longitudinal ends of the casing, the end caps each having direction changing passages;
a large number of rolling elements rolling and circulating through raceways formed between the first raceway grooves and the second raceway grooves and through the direction changing passages and the return passages; and
under seals fitted to the end caps, each of the under seals being made up of a metallic core member and an elastic sealing member secured to the core member;
said linear motion rolling guide unit characterized in:
that each sealing member has a first lip portion that can be brought into sealing contact with the underside of the casing and the end caps and a second lip portion that can be brought into sealing contact with the side wall surfaces of the track rail;
that the end caps each have on each side a pair of projections protruding from the underside of the end caps, the projections in each pair being spaced from each other widthwise, and each projection is formed with an engagement portion at the front end thereof;
that the under seals are each formed with engagement opening in the core member and the engagement opening has an engagement claw formed at each longitudinal edge portion thereof; and
that the projections are elastically deformed and inserted into the engagement openings until the engagement portions of the projections engage the engagement claws to attach the under seals to the end caps.

2. A linear motion rolling guide unit as claimed in claim 1, characterized in:
that the projections provided to the end caps extend parallel to each other and longitudinally of the end cap and are each formed at their front ends with an engagement portion that projects widthwise of the end cap;
that the engagement openings formed in the core member are longer than the longitudinal lengths of the projections;
that the core member has the engagement claws formed integral therewith that extend inwardly from the peripheral portion of the engagement openings; and
that the engagement portions of the projections are held by the engagement claws of the core members to mount the under seals to the end caps.

3. A linear motion rolling guide unit as claimed in claim 2, characterized in:
that the projections are formed rectangular in cross section and the engagement portions of the projections extend over the entire length of the longer side of the rectangle on both sides; and
that the engagement openings in the core member are rectangular and the engagement claws are formed over the entire lengths of the longer sides of each engagement opening on both sides.

4. A linear motion rolling guide unit as claimed in claim 1, characterized in:
that the sealing member has a raised portion that extends on the upper surface of the core member and which is made of the same material as that of the sealing member; and
that when the under seals are mounted to the end caps, the raised portions come into elastic contact with the underside of the end caps thereby vertically positioning the under seals with respect to the end caps.

5. A linear motion rolling guide unit as claimed in claim 1, characterized in:
that the projections are formed integral with the end caps and made of the same material as that of the end caps.

6. A linear motion rolling guide unit as claimed in claim 1, characterized in:
that the projections are formed separate from the end caps and securely fitted into insertion holes formed in the end caps.

* * * * *